(No Model.)
G. BROCK.
WHEEL FOR VEHICLES.
No. 336,207. Patented Feb. 16, 1886.
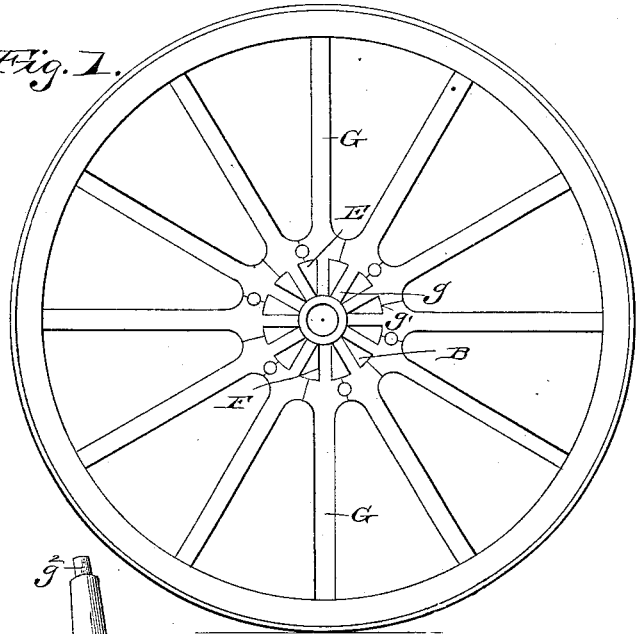
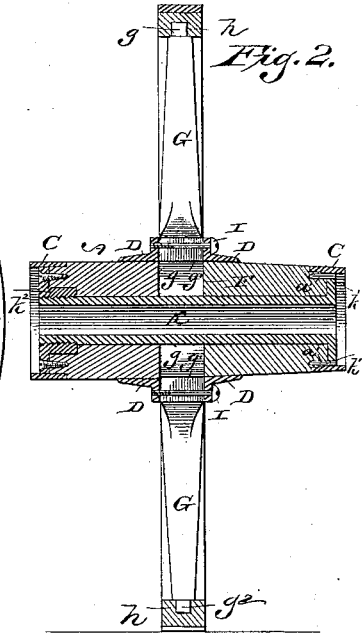
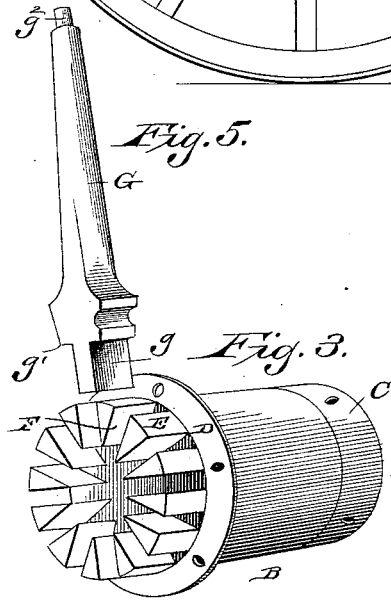
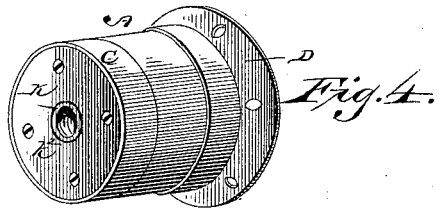
WITNESSES
INVENTOR
Granville Brock.
Attorneys.

UNITED STATES PATENT OFFICE.

GRANVILLE BROCK, OF SPARTA, KENTUCKY.

WHEEL FOR VEHICLES.

SPECIFICATION forming part of Letters Patent No. 336,207, dated February 16, 1886.

Application filed August 17, 1885. Serial No. 174,592. (No model.)

*To all whom it may concern:*

Be it known that I, GRANVILLE BROCK, a citizen of the United States, residing at Sparta, in the county of Owen and State of Kentucky, have invented a new and useful Improvement in Wheels for Vehicles, of which the following is a specification, reference being had to the accompanying drawings.

My invention relates to an improvement in wheels for vehicles; and it consists in the peculiar construction and combination of devices, that will be more fully set forth hereinafter, and particularly pointed out in the claims.

In the drawings, Figure 1 is an elevation taken from the rear side of a wheel embodying my invention, with one section of the hub removed. Fig. 2 is a sectional view taken on the line $x\,x$ of Fig. 1. Fig. 3 is a detailed perspective view of the front section of the hub. Fig. 4 is a similar view of the rear section of the hub. Fig. 5 is a perspective view of one of the spokes.

The hub of my improved vehicle-wheel is composed of two sections—the front section, A, and the rear section, B. These sections are provided at their outer ends with metallic circular bands C, and on their inner ends with flanged clamping-rings D. The ring D on the section B is secured at some distance from the inner end of said section, so as to leave a projecting shoulder, E, beyond said ring, in which shoulder are made the radial recesses F, to receive the reduced ends $g$ of the spokes G. These spokes have the shoulders $g'$ beyond the reduced ends, which bear on the shoulder of the section B. The outer ends of the spokes are reduced, as at $g^2$, and inserted in corresponding recesses, $h$, made in the felly of the wheel. The section A, after the spokes have been inserted in the felly and in the section B, is clamped against section B by means of screws I, that pass through one of the rings D and the meeting edges of the spokes and enter the opposite ring, as shown in Fig. 2, thereby clamping the inner ends of the spokes securely between the sections of the hub.

K represents the thimble, which passes through the central openings in the hub-sections. This thimble is provided at its outer end with a flange or head, $k$, having peripheral notches $k'$, and in these notches fit studs $a'$, that project from the front side of the hub, and prevent the thimble from rotating in the hub and thereby wearing the latter. The inner end of the thimble is screw-threaded, and on the threaded end is screwed a circular clamping-nut, $k^2$, that serves to secure the hub-sections together.

A wheel thus constructed can be readily taken apart when the felly shrinks or the tire becomes loose, so as to tighten the same by driving wedges between the inner ends of the spokes and the thimble or putting washers on the outer ends of the spokes, or both, to expand the felly and tighten the tire, thus avoiding the necessity of cutting and shrinking the tire, as is now the common practice. This construction of the wheel is also advantageous, in permitting any part which may become broken to be taken out and replaced or repaired.

Having thus described my invention, I claim—

1. The combination, with the hub-sections having the caps C at each end and projecting studs $a'$ at one end only, of the interior thimble, K, provided at one end with a circular integral head, $k$, which fits over the end of the hub closely within the cap C, and is notched or perforated at $k'$, to receive the studs $a'$ and prevent the rotation of the hub on the spindle, the other end of the latter being exteriorly threaded, and a circular clamping-nut, $k^2$, fitting closely within the cap C and screwing over the threaded end of the thimble, and having an extension which is received in an enlarged recess of the hub, as set forth.

2. The combination, with the hub-sections A B, each provided at their inner ends with flanged clamping-rings D, the ring D of section B being set back at some distance from the inner end to leave a shoulder, E, and recesses F, provided in the latter, of the spokes G, having reduced oblong portion $g$, fitting in the recesses F, and the shoulders $g'$ beyond the reduced portions, bearing on the shoulders E, bolts I, connecting the rings D of the sections, the felly or rim provided with circular recesses $h$, and the reduced circular portion $g^2$, provided on the ends of the spokes, as and for the purpose set forth.

In testimony that I claim the foregoing as my own I have hereto affixed my signature in presence of two witnesses.

GRANVILLE BROCK.

Witnesses:
CASWELL SAMUEL,
JOHN W. GREENE.